No. 665,378. Patented Jan. 1, 1901.
D. J. ARCHER.
MANUFACTURE OF SELF IGNITING GAS MEDIUMS.
(Application filed June 15, 1900.)
(No Model.)

Witnesses
L. C. Reynolds
M. B. Peer

Inventor:
D. J. Archer,
by Egerton R. Case,
Atty.

UNITED STATES PATENT OFFICE.

DAVID JOHN ARCHER, OF TORONTO, CANADA, ASSIGNOR OF ONE-FOURTH TO WILLIAM JAMES McMURTRY, OF SAME PLACE.

MANUFACTURE OF SELF-IGNITING GAS MEDIUMS.

SPECIFICATION forming part of Letters Patent No. 665,378, dated January 1, 1901.

Application filed June 15, 1900. Serial No. 20,444. (No model.)

*To all whom it may concern:*

Be it known that I, DAVID JOHN ARCHER, a subject of the Queen of Great Britain, residing at Toronto, in the county of York, Province of Ontario, Canada, have invented certain new and useful Improvements in the Manufacture of Self-Igniting Gas Mediums, of which the following is a specification.

My invention relates to improvements in the manufacture of self-igniting gas mediums; and the object of my invention is to prevent the coalescing, caused by heat, of the atoms of platinum-black or any other substance in powder form possessing the property of causing gas to ignite and to render the platinum wire used therewith incandescent in the shortest possible space of time after the gas has been turned on; and it consists, essentially, in suitably mixing together a suitable quantity of bone-ash, or any other substance of a porous nature in powder form capable of withstanding the action of red heat, with a suitable quantity of platinum-black or any other substance in powder form possessing the property of causing gas to ignite and treating the compound, as hereinafter particularly described, so as to form what I call a "pellet," a fine platinum wire being held in contact with said pellet, the said pellet and platinum wire being held by, but insulated from, a suitable holder, which is designed to be attached to the side of the ordinary gas-burner, as hereinafter more particularly explained.

Figure 1:
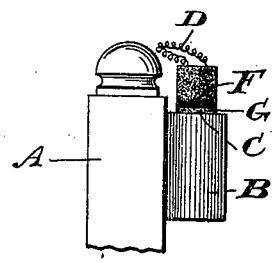
Figure 2:
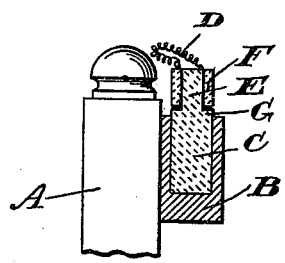
Figure 3:
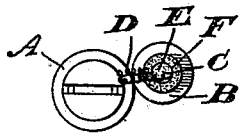

Figure 1 is a side elevation of the ordinary gas-burner and my self-igniting gas medium attached thereto. Fig. 2 is a vertical section through my self-igniting gas medium, showing its construction, the same being attached to the side of an ordinary gas-burner, a side elevation of which is also herein shown. Fig. 3 is a plan view of an ordinary gas-burner and my self-igniting gas medium attached thereto, showing the relative position of the said self-igniting gas medium to the flow of the gas from said burner.

It is well known that platinum-black will occlude a large quantity of oxygen from the air and that if a stream of hydrogen be directed upon the platinum the chemical combination of the two gases takes place with sufficient energy to raise the temperature of the platinum-black until the same becomes red-hot or is sufficiently hot to render incandescent a platinum wire held thereagainst, which, being situated where the air and gas mix, ignites the gas. It has been found that repeated heating of the platinum-black causes the atoms of the same to coalesce. When the said atoms have more or less coalesced, they are not in a finely enough divided condition to occlude oxygen at the ordinary temperature and cause the combination therewith of hydrogen gas with sufficient rapidity so as to render the platinum wire incandescent when the said wire is in the path of the gas. In order to overcome these defects in other gas-lighting apparatus, I have invented the following-described process of manufacturing self-igniting gas mediums: I buy a suitable quantity of bone-ash from the chemist and heat it sufficiently so as to remove all impurities therefrom and let the same cool off. After this operation I thoroughly mix with a suitable quantity of water or any other suitable moistening substance, so as to make a paste that can be easily worked, platinum-black and bone-ash about the proportion of one-third bone-ash to two-thirds platinum-black. This mixture I put into a suitable mold, so as to form what I term a "pellet," preferably with a hole through the center thereof. When the pellet is in the mold, I dry or bake it in a gradually-rising temperature until it is hard enough to be handled without damaging it. I then remove the pellet from the mold and put it into a flame and heat it to a red heat. When it becomes red-hot, the pellet is removed from the flame and allowed to gradually cool off in the atmosphere.

By mixing the platinum-black with the bone-ash and treating the compound in the manner just described I find that the atoms of platinum-black are prevented from coalescing by the atoms of the bone-ash, and thus their efficiency to occlude oxygen from the air will not be impaired.

Referring to the drawings, A is the gas-burner, and B any suitable metal holder suitably secured to the side of said burner. Held in the holder B is a stick of suitable insulating material C, such as carbon. Extending into the path of the gas is a length of preferably looped platinum wire D, curled or straight, which is held between the reduced portion E of the insulating material C and the pellet F, which is made of platinum-black and bone-ash, as before described. The ends of the platinum wire D rest upon the shoulder G of the insulating material E, and the pellet F rests upon said ends. This shoulder G, it will be seen, extends above the metal holder B, so that no portion of the pellet F or wire D will touch such holder or any portion of the gas-burner.

It will be understood that the shape of the pellet F and means for holding the same and the wire D in position may be considerably modified.

It must be further understood that I can either mix the platinum-black and bone-ash together in a dry state and make the compound into a paste by using any suitable moistening substance for that purpose or else I can make each substance into a paste separately and mix them together afterward.

The pellet above described, though not directly in the path of the escaping gas, is so near the same as to be reached by the gaseous diffusion incident to escape, and in this way hydrogen is supplied to the oxygen occluded in the mixture of platinum-black and fine incombustible material, and ignition of the gas results.

What I claim as my invention, and desire to secure by Letters Patent, is—

1. As a new article of manufacture, a medium for igniting gas by its own action, as described, said medium consisting of platinum-black so mixed with bone-ash as to form a porous pellet.

2. As a new article of manufacture, a medium for igniting gas by its own action, as described, said medium consisting of two-thirds platinum-black and one-third bone-ash, the two substances being so mixed as to form a pellet of fine porosity.

3. As a new article of manufacture, a medium for igniting gas by its own action, as described, said medium consisting of platinum-black mixed with bone-ash and forming a pellet of fine porosity, substantially as set forth.

4. As a new article of manufacture, a medium for igniting gas by its own action, as described, comprising a hard pellet composed of platinum-black and bone-ash, means for holding said pellet in proximity to a gas-burner and an incandescing wire extending from said pellet in position to ignite the gas flowing from a gas-burner, whereby when a stream of gas strikes said pellet said wire will be heated by said pellet and ignite the gas.

5. In an automatic gas-lighter in combination with a gas-burner, an insulating-holder in proximity to the said burner, a pellet carried by said holder and consisting of platinum-black and bone-ash, a wire heated by said pellet when the gas is turned on, and suitable means for supporting said insulating-holder, as set forth and for the purpose specified.

In testimony whereof I have signed my name to this specification in the presence of two subscribing witnesses.

DAVID JOHN ARCHER.

Witnesses:
EGERTON R. CASE,
LAWRENCE C. REYNOLDS.